(12) United States Patent
Buchanan et al.

(10) Patent No.: US 10,619,663 B2
(45) Date of Patent: Apr. 14, 2020

(54) DUAL LOAD PATH FASTENER SYSTEM

(71) Applicant: SHORT BROTHERS PLC, Belfast (GB)

(72) Inventors: Graeme Buchanan, Craigavon Armagh (GB); Patrick McWall, Newry Down (GB)

(73) Assignee: SHORT BROTHERS PLC, Belfast (GB)

( * ) Notice: Subject to any disclaimer, the term of this patent is extended or adjusted under 35 U.S.C. 154(b) by 198 days.

(21) Appl. No.: 15/561,653

(22) PCT Filed: Mar. 8, 2016

(86) PCT No.: PCT/GB2016/050633
§ 371 (c)(1),
(2) Date: Sep. 26, 2017

(87) PCT Pub. No.: WO2016/156787
PCT Pub. Date: Oct. 6, 2016

(65) Prior Publication Data
US 2018/0073545 A1    Mar. 15, 2018

(30) Foreign Application Priority Data

Mar. 27, 2015  (GB) .................................. 1505247.5

(51) Int. Cl.
*F16B 35/00*     (2006.01)
*F16B 39/04*     (2006.01)
*F16B 35/04*     (2006.01)

(52) U.S. Cl.
CPC ............ *F16B 35/041* (2013.01); *F16B 39/04* (2013.01)

(58) Field of Classification Search
CPC ........ F16B 35/04; F16B 35/041; F16B 39/04; F16B 39/10
(Continued)

(56) References Cited

U.S. PATENT DOCUMENTS 1,433,410 A * 10/1922 Passauer ................. F16B 39/04
                                                     411/207
1,701,511 A *  2/1929 Sisk ........................ F16B 39/08
                                                     411/219
(Continued)

FOREIGN PATENT DOCUMENTS

CN       1091813 A     9/1994
CN       1218545 A     6/1999
(Continued)

OTHER PUBLICATIONS

International Search Report and Written Opinion dated Jun. 15, 2016, for International Patent Application No. PCT/GB2016/050633.
(Continued)

*Primary Examiner* — Flemming Saether
(74) *Attorney, Agent, or Firm* — Karceski IP Law, PLLC

(57) ABSTRACT

A dual load path assembly includes an outer pin, which has an axial through bore and at least one end that includes a threaded section. The threaded section includes at least one slot orientated from the end and extends axially along at least part of the threaded section. The assembly also includes an inner pin, which is receivable in the through bore of the outer fastener. A female fastener comprising at least one notch is receivable on the threaded end of the outer pin. A locking plate comprises a through hole via which it is receivable on the shank of the inner pin and at least one projection. The locking plate is arranged such that the projection is receivable in both the notch and the slot. A locking member engages with the end of the inner pin and abuts a face of the locking plate thereby sandwiching the locking plate between the locking member and the female fastener.

9 Claims, 2 Drawing Sheets

(58) Field of Classification Search
USPC .... 411/366.1, 367, 383, 321, 315, 200, 208, 411/216–221
See application file for complete search history.

(56) References Cited

U.S. PATENT DOCUMENTS

| | | | |
|---|---|---|---|
| 2,359,046 A * | 9/1944 | Miller | B23P 19/068 411/368 |
| 4,435,100 A | 3/1984 | Cox | |
| 4,444,365 A | 4/1984 | Heuberger | |
| 5,328,312 A | 7/1994 | Driscoll | |
| 5,391,032 A * | 2/1995 | Vassalotti | F16B 39/12 411/198 |
| 6,095,735 A | 8/2000 | Weinstein et al. | |
| 6,860,688 B2 | 3/2005 | Bushell et al. | |
| 6,976,817 B1 | 12/2005 | Grainger | |
| 7,121,780 B2 | 10/2006 | Matich et al. | |
| 8,122,797 B2 * | 2/2012 | Bruurs | B23D 17/00 30/223 |
| 2006/0088400 A1 | 4/2006 | Matich et al. | |
| 2013/0149068 A1 * | 6/2013 | Jackson | F16B 39/04 411/315 |
| 2017/0343034 A1 * | 11/2017 | Zollmann | F16B 39/04 |

FOREIGN PATENT DOCUMENTS

| | | |
|---|---|---|
| CN | 101153623 A | 4/2008 |
| CN | 101331330 A | 12/2008 |

OTHER PUBLICATIONS

Chinese Office Action dated Sep. 30, 2018, for Chinese Patent Application No. 201680017999.8.

* cited by examiner

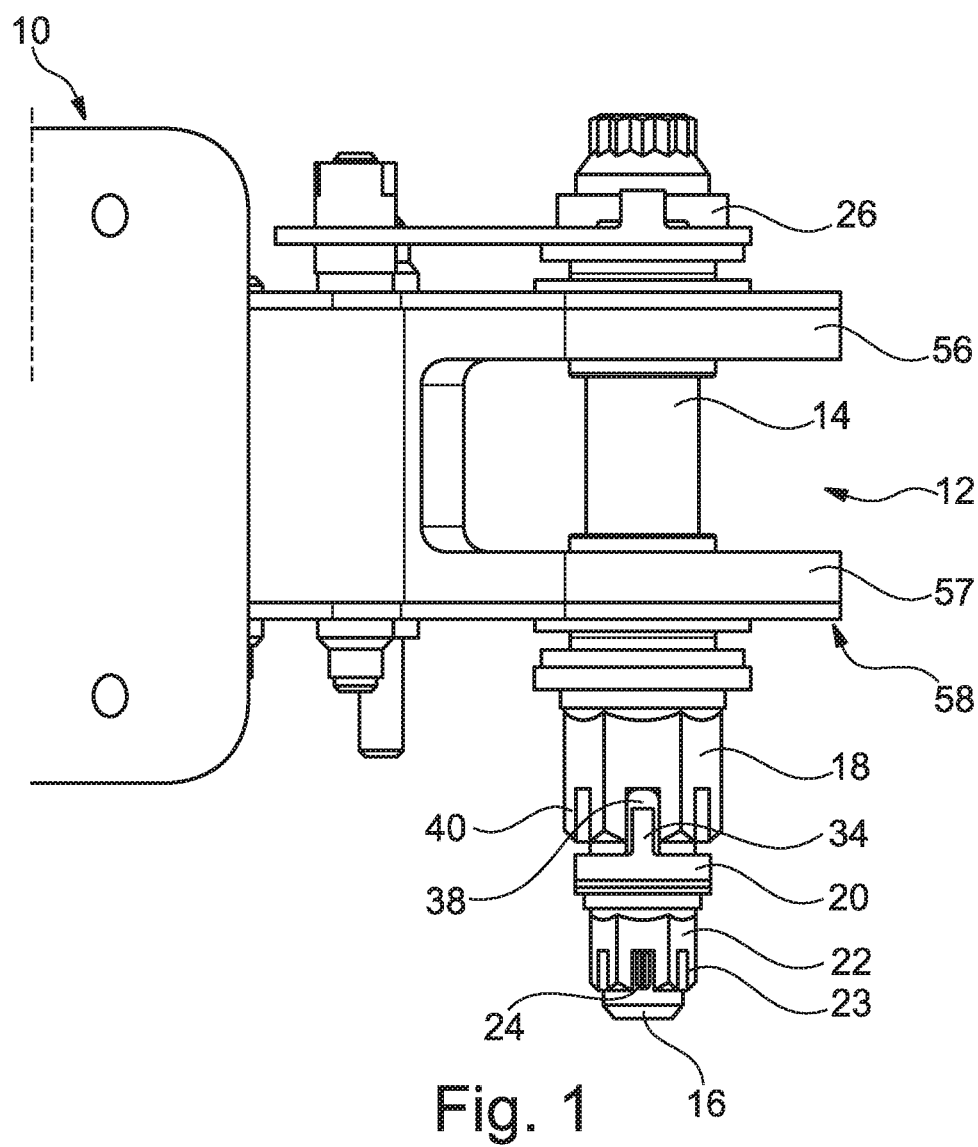
Fig. 1
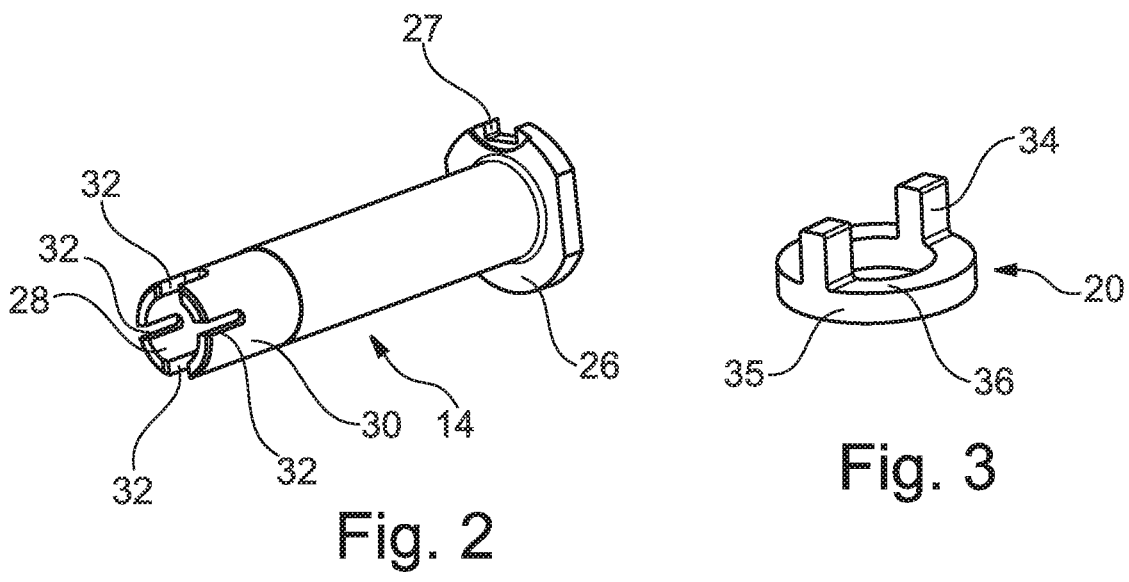
Fig. 2
Fig. 3

DUAL LOAD PATH FASTENER SYSTEM

CROSS REFERENCE TO RELATED APPLICATION AND CLAIM OF PRIORITY

This is a National Stage Entry into the United States Patent and Trademark Office from International PCT Patent Application No. PCT/GB2016/050633, having an international filing date of 8 Mar. 2016, and which claims the benefit of and priority to United Kingdom Patent Application No. GB 1505247.5, filed on 27 Mar. 2015, the entire contents of both of which are incorporated herein by reference.

FIELD OF THE INVENTION

The present invention relates to a dual load path fastener system. In particular, the present invention relates to a mechanical fastener system including separate and independent load paths and a failsafe system which operates if there is failure in one load path.

BACKGROUND TO THE INVENTION

A horizontal stabiliser or tailplane assembly, as it is also known, is an example of an application that utilises a dual load path fastener system. The horizontal stabiliser comprises a fixed member and a hinged aft elevator. The arrangement of the hinged aft elevator relative to the fixed member is that of a joint, which is secured by a dual load path connector which facilitates pivotal movement of the elevator relative to the fixed member of the tailplane assembly.

The fastener arrangement is typically provided by an inner fastener/pin and an outer fastener/pin, where the outer pin is configured as a sleeve to receive the inner pin. Both pins are secured relative to each other such that they define separate and independent load paths. Therefore, if one pin fails the other pin provides a load path that can independently carry any load such that continued safe flight and landing is possible.

Federal Aviation regulations (FAR 25) requires, in respect of fasteners for a locking arrangement such as the dual load path fastener arrangement described above, that the fasteners are provided with a primary friction lock and a secondary mechanical locking device operable to lock the primary friction lock. A primary friction lock may be provided by, for example, a nut secured to a threaded shank.

An example of an existing locking arrangement for a dual load path fastener arrangement is that of a castellated nut providing the primary friction lock and a cotter pin as the mechanical locking device.

Typically, a hole is provided through the shank of the inner and outer pins in the region of a notch between castellations where the nut is fitted to the outer pin. When assembled the hole is aligned with a notch on the castellated nut and the cotter pin extends through the hole via the notch. By securing the cotter pin, in place, rotation of the castellated nut is prevented.

In the event that the outer pin fails it represents a redundant load and the pin is able to spin freely. Such free rotation can lead to shearing of the cotter pin, which may fall out and the continued free spinning of the outer pin may lead to loosening and ultimately removal of the castellated nut, which relies on friction to keep it secure. As such the arrangement does not represent a reliable fail-safe system.

It is desirable to provide an improved dual load path system.

It is further desirable to provide a dual load path system that mitigates the above problems.

SUMMARY OF THE INVENTION

A first aspect of the present invention provides a dual load path fastener assembly comprising:

an outer male fastener, comprising an axial through bore and at least one end comprising a threaded section, wherein the threaded section includes at least one slot orientated from the end and extending axially along at least part of the threaded section;

an inner male fastener, comprising a shank, which is receivable in the through bore of the outer fastener;

at least one female fastener receivable on the threaded end of the outer fastener, wherein a face of the female fastener includes at least one axially extending notch;

a locking plate comprising at least one projection, wherein the projection projects longitudinally from a first face of the plate; wherein the locking plate includes a through hole via which the locking plate is receivable on the shank of the outer fastener and is arranged to engage with the at least one female fastener, wherein engagement is via the projection being receivable in the notch and in the slot; and at least one locking member configured to engage with the end of the inner fastener and a second face of the locking plate thereby sandwiching the locking plate between the locking member and the female fastener.

The physical engagement of the projection, the slot and the notch means that if, for example, the outer fastener breaks the projection stays in place within the slot on the outer fastener and the notch of the female fastener such that free spinning of the outer fastener in relation to the female fastener is prevented. As such the load bearing capacity of the outer fastener becomes redundant and the inner fastener continues to bear the load such that the equipment in which the dual load path fastener assembly is used can be continue to be used safely with reduced risk of the nut releasing during use.

The locking plate may comprise a plurality of projections, slots and notches of at least a corresponding quantity. A projection must be received in a slot and a notch therefore there must be at least the same number of slots and notches to receive the projections. The number of slots and/or notches may be greater in number than the number of projections, wherein the distribution of the slots and notches at least corresponds with the distribution of the projections.

A plurality of projections may increase the holding capacity of the arrangement compared with a system comprising a single projection in the event that one of the outer or inner fastener fails.

The projections may be arranged in pairs and may comprise at least one pair. Accordingly, the slots and notches may be arranged in pairs. The distribution of the slots and notches, whether the same in number or greater in number than the number of projections corresponds with the distribution of the projections. The locking plate may be an annular plate. The projections, slots and notches of each pair may be diametrically disposed.

Having a greater number of notches and slots may provide for easier aligning of the projections with the slots and notches when assembling the component parts. Also, the amount of adjustment required of the frictional lock to align the notches, slots and projections may be reduced compared with the arrangement using a cotter pin as the additional mechanical lock.

Each projection is receivable in a notch and a slot when the fastener assembly is assembled.

The female fastener may comprise a castellated nut.

BRIEF DESCRIPTION OF THE DRAWINGS

Embodiments of the present invention are described below, by way of example only, with reference to the accompanying drawings, in which:

FIG. 1 illustrates a dual load path fastener assembly according to an embodiment of the present invention;

FIG. 2 illustrates an example of an outer fastener used in a dual load path fastener assembly according to an embodiment of the present invention;

FIG. 3 illustrates an example of a locking plate for use in a dual load path fastener assembly according to an embodiment of the present invention.

BRIEF DESCRIPTION

Figure 4:
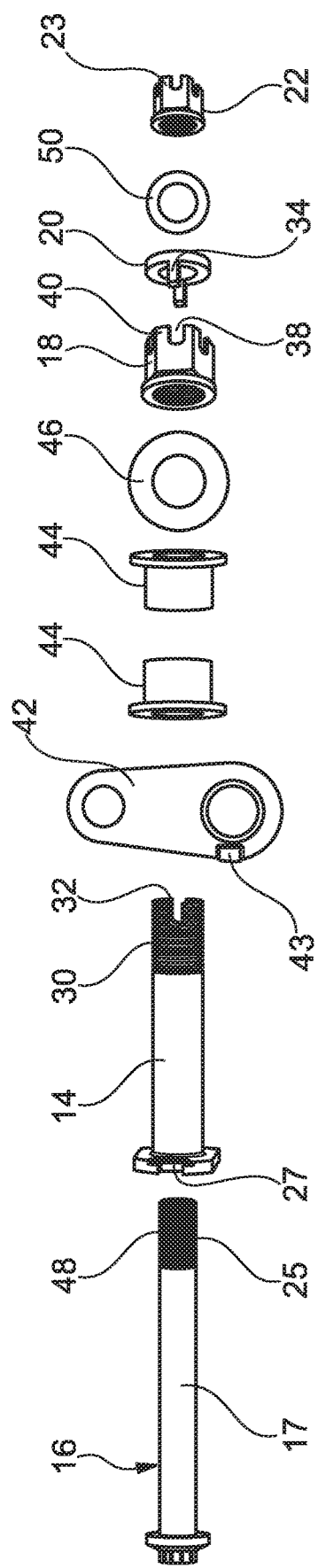
FIG. 4 illustrates an exploded view of the dual load path fastener assembly of FIG. 1.

Referring to FIG. 1 there is illustrated part of a horizontal stabiliser 10, which includes a dual load path fastener assembly 12 according to an embodiment of the present invention.

Although the dual load path fastener assembly 12 will be described herein in the context of a horizontal stabiliser 10, it is to be understood that the dual load path fastener assembly 12 may be used with components other than the horizontal stabiliser 10.

The dual load path fastener assembly 12 includes an outer pin 14, an inner pin 16, a castellated nut 18, a locking plate 20 and a locking nut 22. The locking nut 22, as illustrated, is a castellated nut and includes a cotter pin 24 as the secondary mechanical locking device, where the cotter pin 24 extends through a hole 25 (see FIG. 4) through the shank 17 of the inner pin 16 and between castellations 23.

The outer pin 14, as illustrated in FIG. 2, includes a head 26, a hollow shank 28 and a threaded section 30, which is located at the end of the shank 28 opposite to the head 26.

In the illustrated example, the threaded section 30 of the outer pin 14 includes two notches or slots 32, which extend longitudinally from the end along at least part of the threaded section 30. The slots 32 are diametrically disposed and are located to correspond with projections 34, which extend longitudinally from the locking plate 20, as illustrated in FIG. 3.

The locking plate 20 comprises an annular plate element 35. Two diametrically disposed projections 34 extend from one face 36 of the annular plate element 35. The projections 34 are shaped and positioned to correspond with the shape and position of the slots 32 such that both engage when the parts are assembled to provide a dual load path fastener assembly 12.

In the illustrated example the outer pin 14 includes a castellated nut 18. The notches/spaces 38 between castellations 40 are configured to receive and engage with the projections 34 when the parts are assembled to provide a dual load path fastener assembly 12.

It will be appreciated that the illustrated example includes two projections 34, two slots 32 and a regular castle nut arrangement of six castellations 40 and six notches 38. The spacing of the castellations 40 is influenced by the regular hexagonal form of the nut. Therefore, in the illustrated example the slots 32, notches 38 and projections 34 are arranged in pairs. The projections 34 are distributed and shaped such that they each engage with a slot 32 in the outer pin 14 and a notch 38 in the castellated nut 18.

In the illustrated example the dual load path fastener assembly 12 is shown as part of a pivotally movable load carrying joint, for example a horizontal stabiliser 10. The component parts of the fastener assembly 12, illustrated in FIG. 1, are shown in the exploded view illustrated in FIG. 4.

Viewing FIG. 4 from left to right there is included an inner pin 16, an outer pin 14, a link member 42, two bushes 44, a plain washer 46, a castellated nut 18, a locking plate 20, a further plain washer 50 and a final locking nut 22. A cotter pin (not illustrated) is used with the final locking nut 22 as a secondary mechanical locking device. In the illustrated example the final locking nut 22 is a castle nut and when assembled a notch 23 in the castle nut 22 aligns with a hole 25 provided through the shank 17 of the inner pin 16 and the cotter pin is inserted and secured in the conventional manner.

Assembling the fastener assembly 12 comprises locating the bushes 44 through the fork ends 56, 57 of a yoke/clevis joint 58. The link plate 42 is located and locked to the outer pin 14 at the head end 26 of the outer pin 14. In the illustrated example, the head 26 includes a notch 27 and the link plate 42 includes a single projection 43 which engages with the notch 27 in a manner similar to the engagement of the locking plate 20 and the castellated nut 18. The outer pin 14 is then inserted through the bushes 44 and the fork ends 56, 57 such that the threaded end 30 extends beyond the outer face of the lowermost fork end 57 (as viewed in FIG. 1). The plain washer 46 is located on the threaded end 30 of the outer pin 14 followed by the first castellated nut 18. The locking plate 20 is applied over the end of the outer pin 14 and the rotational position of the castellated nut 18 is adjusted such that slots 32 in the outer pin 14 align with the notches 38 of the castellated nut 18 and the projections 34 provided on the locking plate 20. The additional plain washer 50 and the final locking nut 22 are fitted to the threaded end 48 of the inner pin 16 and tightened such that the locking plate 20 is securely held against the end of the outer pin 14 and the projections 34 are fully engaged with the notches 32 at the end of outer pin 14.

For the given example, a horizontal stabiliser 10, the hinge pins must have separate and independent load paths. These paths are provided by the arrangement of the inner pin 16 and the outer pin 14 as described above. As such if one pin 14, 16 fails, for example the outer pin 14, the positive engagement of the projections in the slots and notches prevents rotation of the castellated nut 18 and therefore the load path defined by the outer pin 14 becomes redundant and the inner pin 16 is active such that continued safe flight and landing is assured.

Whilst specific embodiments of the present invention have been described above, it will be appreciated that departures from the described embodiments may still fall within the scope of the present invention.

The invention claimed is:

1. A dual load path fastener assembly, comprising:
    an outer male fastener, comprising an axial through bore and at least one end comprising a threaded section, wherein the threaded section includes at least one slot orientated from the end and extending axially along at least part of the threaded section;

an inner male fastener, comprising a shank, which is receivable in the through bore of the outer fastener;

at least one female fastener receivable on the threaded end of the outer fastener, wherein a face of the female fastener includes at least one axially extending notch;

a locking plate comprising at least one projection, wherein the projection projects longitudinally from a first face of the plate, wherein the locking plate includes a through hole via which the locking plate is receivable on the shank of the inner fastener and is arranged to engage with the at least one female fastener, and wherein engagement is via the at least one projection being receivable in the at least one notch and in the at least one slot; and at least one locking member configured to engage with the end of the inner fastener and a second face of the locking plate thereby sandwiching the locking plate between the locking member and the female fastener.

2. A dual load path fastener assembly as claimed in claim 1, wherein the at least one projection comprises a plurality of projections, wherein the at least one slot comprises a plurality of slots, and wherein the plurality of projections and the plurality of slots are of at least a corresponding quantity.

3. A dual load path fastener assembly as claimed in claim 2, wherein the plurality of projections and the plurality of slots are arranged in pairs and comprise at least one pair.

4. A dual load path fastener assembly as claimed in claim 3, wherein the plurality of projections and the plurality of slots of each pair are diametrically disposed.

5. A dual load path fastener assembly as claimed in claim 3, wherein the plurality of slots on the outer fastener outnumber the plurality of projections.

6. A dual load path fastener assembly as claimed in claim 1, wherein the locking plate is an annular plate.

7. A dual load path fastener assembly as claimed in claim 1, further comprising corresponding spacing of the at least one slot on the outer fastener, the at least one notch on the female fastener, and the at least one projection on the locking plate such that, when assembled, the at least one projection is received in the at least one slot and the at least one notch, which are aligned with the at least one projection.

8. A dual load path fastener assembly as claimed in claim 1, wherein the at least one notch comprises a plurality of notches, wherein the at least one projection comprises a plurality of projections, and wherein the plurality of notches corresponds in number at least to the plurality of projections.

9. A dual load path fastener assembly as claimed in claim 1, wherein the female fastener comprises a castellated nut.

* * * * *